(12) United States Patent
Koda et al.

(10) Patent No.: US 7,997,804 B2
(45) Date of Patent: Aug. 16, 2011

(54) ROLLING BEARING APPARATUS

(75) Inventors: Kanichi Koda, Kashiba (JP); Kiyoshi Ogino, Kashihara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 706 days.

(21) Appl. No.: 12/068,308

(22) Filed: Feb. 5, 2008

(65) Prior Publication Data

US 2008/0187265 A1 Aug. 7, 2008

(30) Foreign Application Priority Data

Feb. 6, 2007 (JP) ................................. 2007-026705
Mar. 30, 2007 (JP) ................................. 2007-090821

(51) Int. Cl.
F16C 43/04 (2006.01)
F16C 23/10 (2006.01)

(52) U.S. Cl. .......................... 384/556; 384/563; 384/583

(58) Field of Classification Search ................... 384/493, 384/495, 510, 517, 519, 537, 556, 558, 559, 384/563, 583–585
See application file for complete search history.

(56) References Cited

U.S. PATENT DOCUMENTS

| | | | | |
|---|---|---|---|---|
| 3,945,486 A | * | 3/1976 | Cooper | 198/803.7 |
| 4,657,412 A | * | 4/1987 | McLarty et al. | 384/447 |
| 5,051,005 A | * | 9/1991 | Duncan | 384/517 |
| 5,803,619 A | * | 9/1998 | Tabata et al. | 384/518 |
| 6,250,815 B1 | * | 6/2001 | Picone et al. | 384/557 |
| 6,895,749 B2 | * | 5/2005 | Tohru | 60/563 |
| 6,951,206 B2 | | 10/2005 | Kishimoto | |

FOREIGN PATENT DOCUMENTS

| | | |
|---|---|---|
| DE | 35 25 691 A1 | 2/1986 |
| DE | 38 10 448 A1 | 10/1988 |
| DE | 199 46 383 A1 | 4/2001 |
| EP | 0 692 645 A1 | 1/1996 |
| JP | 2003-184873 | 7/2003 |
| JP | 2003-307161(A) | 10/2003 |
| JP | 2006-153090 | 6/2006 |
| JP | 2006-162011 A | 6/2006 |

OTHER PUBLICATIONS

European Search Report dated dated Mar. 24, 2009.
European Search Report dated Jun. 18, 2008.
Japanese Office Action dated Jun. 7, 2011 with English translation thereof.

* cited by examiner

Primary Examiner — James Pilkington
(74) Attorney, Agent, or Firm — McGinn IP Law, PLLC

(57) ABSTRACT

A rolling bearing apparatus includes inner and outer rings in which a preload applying unit applies a preload to the outer ring. If a fluid pressure in a fluid supply passage is higher than a first set pressure, then fluid is supplied to a pressure chamber via a check valve, and if a pressure becomes lower than the first set pressure, then fluid is supplied from a hydraulic pump to the pressure chamber via the check valve. If the pressure becomes higher than a second set pressure, then the fluid is discharged from the pressure chamber via a relief valve, and if the pressure within the pressure chamber becomes higher than a third set pressure, which is higher than the first set pressure but is lower than the second set pressure, then the supply of fluid is stopped. Thus, the pressure within the pressure chamber is maintained between the first and second set pressures.

8 Claims, 5 Drawing Sheets

ROLLING BEARING APPARATUS

BACKGROUND OF THE INVENTION

This invention relates to a rolling bearing apparatus, such as a tapered roller bearing and an angular contact ball bearing, used under a preload.

A tapered roller bearing and an angular contact ball bearing are used while subjected to an axial preload. For example, in a gear-type drive transmission unit of an automobile such as a transmission unit, a tapered roller bearing is provided at a required portion thereof (for example, at a final reduction gear portion in the transmission unit). As shown in FIG. 5A, in this tapered roller bearing 111, a rotation shaft 115 is press-fitted in an inner ring 133, and an outer ring 132 is fitted to a housing 125 of a transmission case, and thereafter a preload is applied toward one side (indicated by arrow a) in an axial direction. When the preload is thus applied, the outer ring 132 receives component forces on inclined rolling contact surfaces of tapered rollers 134, and is displaced axially and radially, and a left end surface 132c and an outer peripheral surface 132b of the outer ring 132 are pressed respectively against an inner end surface 125c and an inner peripheral surface 125a of the housing 125, thereby supporting the preload.

On the other hand, as one part of recent attempts to achieve a lightweight design, a transmission case (housing) has been formed of light metal such as an aluminum (Al) alloy. Among structural materials, Al is the highest in linear expansion coefficient (about $23.5 \times 10^{-6}/°C$. at room temperature: The unit of the linear expansion coefficient will hereinafter be expressed by ppm/°C.), and its linear expansion coefficient is quite different from a linear expansion coefficient (about 12 ppm/°C. at room temperature) of steel (Fe-based material) forming the rotation shaft and the tapered roller bearing.

When the rotation shaft and the housing are made of the same material, a preload acting on the tapered roller bearing will not change considerably, since the rotation shaft and the housing are subjected to the same dimensional change due to a temperature change. However, when the housing is made of light metal, the amount of dimensional change of the housing due to a temperature rise is larger than that of the rotation shaft, which leads to a fear that the preload may be eliminated.

More specifically, as shown in FIG. 5B, when the temperature of the transmission rises, the housing 125 and the rotation shaft 115 expand, and because of the difference in the amount of dimensional change due to this expansion, an inner periphery raceway surface 132a of the outer ring 132 is separated from the rolling contact surfaces of the tapered rollers 134 in a direction of arrow b. Namely, an axial clearance and a radial clearance of the tapered roller bearing change considerably because of the temperature change, so that the preload becomes insufficient. This insufficient preload invites the shaking of the gear, and causes the generation of noises.

In order to solve the above problem, JP-A-2006-153090 discloses a rolling bearing apparatus in which a preload is applied to an outer ring by a hydraulic pressure and a spring. More specifically, a cylinder of a tubular shape with a closed bottom is formed at a housing, and an outer ring is fitted in this cylinder so as to slide in an axial direction, and within this cylinder, a disk-shaped preload member (piston) is held against an axially-outer end of the outer ring to close an opening in this axially-outer end. A hydraulic fluid is supplied to a pressure chamber, surrounded by an inner surface of the cylinder and the preload member, by a hydraulic pump. Further, a compression coil spring is provided within the pressure chamber, and urges the preload member inward in the axial direction.

In this construction, a preload is applied to the preload member by a hydraulic pressure and the compression coil spring, and when the housing is changed in dimension in a larger amount than a rotation shaft and the outer ring because of a temperature rise, the outer ring is moved inward in the axial direction via the preload member under the influence of the compression coil spring and the hydraulic pressure, thereby suppressing the changing of an axial clearance and a radial clearance in the tapered roller bearing, thus overcoming a lack of the preload.

In the technique of JP-A-2006-153090, however, the hydraulic fluid need to be always supplied from a hydraulic pump to the pressure chamber in order to keep the hydraulic pressure within the pressure chamber at a constant level, and therefore there has been encountered a problem that energy consumption is high. Particularly when a mechanism for overcoming the above-mentioned lack of the preload is used in an automatic transmission, it may be proposed to supply part of a hydraulic fluid, used for the hydraulic control of this transmission, to the pressure chamber. In this case, however, it is necessary to increase a discharge of the hydraulic pump by an amount corresponding to the amount of the hydraulic fluid to be supplied to the pressure chamber, and this has invited a problem that additional energy is required.

In the technique of JP-A-2006-153090, the cylinder is formed into a large size (that is, a large diameter) so as to correspond to the overall size of the bearing. Therefore, the amount of dimensional change of the cylinder due to thermal expansion becomes large, so that a clearance between the cylinder and the preload member becomes large. On the other hand, only one O-ring is interposed between the outer peripheral surface of the preload member and the inner peripheral surface of the cylinder. Therefore, when the cylinder is increased in diameter by thermal expansion, the preload member is liable to be inclined, and oil is liable to leak through a clearance between the bearing and the housing, thus inviting a possibility that the sufficient preload can not be applied.

Furthermore, in order to prevent the pressure within the pressure chamber from increasing when the housing is cooled from the temperature-elevated condition, the O-ring interposed between the outer peripheral surface of the preload member and the inner peripheral surface of the cylinder allows the oil to pass therebetween, and therefore this O-ring can not completely prevent the leakage of the oil.

SUMMARY OF THE INVENTION

This invention has been made in view of the above problems, and an object of the invention is to provide a rolling bearing apparatus in which energy can be saved when applying a preload to a rolling bearing by the use of a fluid pressure such as a hydraulic pressure.

It is another object of the invention to provide a rolling bearing apparatus in which a piston for applying a preload to an outer ring is prevented from being inclined within a cylinder, thereby preventing the leakage of a liquid from a hydraulic pressure chamber of a cylinder.

According to one aspect of the present invention, a rolling bearing apparatus comprises:

rolling elements;

an outer ring including a raceway surface formed at an inner periphery thereof and having a first linear expansion coefficient, the rolling elements rolling on the raceway surface, the raceway surface receiving from the rolling elements a radial load and a load directed toward one side in an axial direction;

an inner ring having a raceway surface formed at an outer periphery thereof, the rolling elements rolling on the raceway surface of the inner ring, the inner ring being incorporated in the outer ring through the rolling elements in a preload-applied condition;

a housing in which an outer peripheral surface of the outer ring is fitted such that the outer ring can be moved in the axial direction, the housing having a second linear expansion coefficient larger than the first linear expansion coefficient;

a rotation shaft which is fitted in an inner peripheral surface of the inner ring, and has a third linear expansion coefficient smaller than the second linear expansion coefficient;

a pressure chamber formed as a sealable space between the housing and an end portion of the outer ring at one side in the axial direction; and a preload holding unit that applies a fluid pressure to the pressure chamber to move the outer ring toward the other side in the axial direction to suppress decrease of the preload due to thermal expansion of the housing, wherein the preload holding unit includes:

a pressure source connected to the pressure chamber via a fluid supply passage;

a check valve which is provided at a portion of the fluid supply passage disposed between the pressure chamber and the pressure source, and allows a fluid to flow into the pressure chamber when a pressure of the fluid is higher than a first set pressure;

a relief valve provided at a discharge passage so as to discharge the fluid from the pressure chamber when the pressure in the pressure chamber becomes higher than a second set pressure which is higher than the first set pressure, and a fluid supply control portion which supplies the fluid to the pressure chamber from the pressure source via the check valve when the pressure within the pressure chamber becomes lower than the first set pressure, and stops the supply of the fluid from the pressure source when the pressure within the pressure chamber becomes larger than a third set pressure which is higher than the first set pressure but is lower than the second set pressure.

In the rolling bearing apparatus of this construction, when the pressure of the fluid in the fluid supply passage is higher than the first set pressure, the fluid in the fluid supply passage can be supplied to the pressure chamber via the check valve. When the pressure within the pressure chamber becomes lower than the first set pressure, the fluid can be supplied to the pressure chamber from the pressure source via the check valve. When the pressure within the pressure chamber becomes higher than the second set pressure as when the rolling bearing apparatus, after once subjected to a temperature rise, is allowed to cool as a result of stopping the operation of the rolling bearing apparatus, the fluid can be discharged from the pressure chamber via the relief valve. Then, when the pressure within the pressure chamber becomes higher than the third set pressure, the supply of the fluid can be stopped by the fluid supply control portion. Therefore, in the temperature-elevated condition, the pressure within the pressure chamber can be maintained at the level between the first set pressure and the third set pressure, and the outer ring can be moved toward the other side in the axial direction by the pressure within the pressure chamber, thereby suppressing the decrease of the preload due to thermal expansion of the housing. And besides, when the bearing apparatus is cooled, the pressure within the pressure chamber is prevented from excessively increasing.

Preferably, the end member forming part of the pressure chamber closes an opening of the end portion of the outer ring disposed at the one side in the axial direction. In this case, the area of contact for the fluid obtained when the fluid urges the outer ring can be increased, and also mottle of the fluid pressure is less liable to develop when supplying the fluid, and the outer ring is prevented from being inclined.

Preferably, the end member is formed integrally with the outer ring. In this case, the rigidity of the outer ring is increased, and therefore although the outer ring is fitted in the housing so as to move in the axial direction, the deformation of the raceway surface of the outer ring out of roundness can be suppressed. Therefore, the shaking of the bearing and a shortened life of the bearing can be avoided.

In the present invention, the fluid can be supplied to the pressure chamber from the pressure source only when this supply is needed, and therefore the energy-saving effect can be achieved as compared with the type of apparatus in which a fluid is always supplied from a pressure source.

According to another aspect of the invention, a rolling bearing apparatus comprises:

rolling elements;

an outer ring including a raceway surface formed at an inner periphery thereof and having a first linear expansion coefficient, the rolling elements rolling on the raceway surface, the raceway surface receiving from the rolling elements a radial load and a load directed toward one side in an axial direction;

an inner ring having a raceway surface formed at an outer periphery thereof, the rolling elements rolling on the raceway surface of the inner ring, the inner ring being incorporated in the outer ring through the rolling elements;

a housing in which an outer peripheral surface of the outer ring is fitted such that the outer ring can be moved in the axial direction, the housing having a second linear expansion coefficient larger than the first linear expansion coefficient;

a rotation shaft which is fitted in an inner peripheral surface of the inner ring, and has a third linear expansion coefficient smaller than the second linear expansion coefficient; and a preload applying unit that applies to the outer ring a preload directed toward the other side in the axial direction by a hydraulic pressure, wherein the preload applying unit includes:

a cylinder disposed further toward the one side in the axial direction than the outer ring;

a partition wall which is interposed between the cylinder and the outer ring to close an opening of the cylinder disposed close to the outer ring;

a through hole which is formed through the partition wall such that the cylinder and the housing communicate with each other through the through hole;

a piston including a pressure receiving portion which is fitted in an inner peripheral surface of the cylinder so as to slide in the axial direction, and a pressing portion which is fitted in the through hole so as to slide in the axial direction and abuts against an end surface of the outer ring disposed at the one side in the axial direction;

a pressure supply unit that supplies a hydraulic pressure into the cylinder so that the hydraulic pressure can act on the pressure receiving portion;

a first seal member provided between the inner peripheral surface of the cylinder and an outer peripheral surface of the pressure receiving member; and a second seal member provided between an inner peripheral surface of the through hole and an outer peripheral surface of the pressing portion.

In this construction, the piston of the preload applying unit is supported at least two regions, that is, at the inner peripheral surface of the cylinder and the inner peripheral surface of the through hole through the first and second seal members.

Therefore, even when the cylinder and the partition wall are thermally expanded, the piston is prevented from being inclined. Therefore, the liquid acting on the piston is prevented from leaking to the outer ring through the seal members.

Preferably, there are provided a plurality of the cylinders arranged at equal intervals around an axis of the rolling bearing, and the number of the cylinders is three or more. In this case, the preload can be applied uniformly to the outer ring by the pistons fitted respectively in the cylinders. And besides, each cylinder can be made smaller (in diameter) than a conventional cylinder, and therefore the amount of dimensional change of the cylinder due to thermal expansion is made small, and a clearance between the cylinder and the piston is made small, and therefore the piston is prevented from being inclined, and also the sealing function achieved by the first and second seal members can be properly maintained.

Preferably, within the cylinder, an air chamber is formed between the pressure receiving portion and the partition wall, and a vent hole is formed in the cylinder, and the air chamber and the exterior of the cylinder communicate with each other through the vent hole. With this construction, even when the air chamber is expanded and contracted in accordance with the sliding movement of the piston in the axial direction, the pressure within the air chamber can be kept generally constant. Therefore, the liquid (hydraulic fluid) within the cylinder and a liquid (lubricating oil, etc.), particles resulting from worn portions, etc., within the housing are prevented from being drawn into the air chamber through the first and second seal members, and in contrast dirt and others within the air chamber are prevented from being discharged into the hydraulic pressure chamber of the cylinder and the housing.

In the present invention, the piston for applying the preload to the outer ring can be prevented from being inclined within the cylinder, and the leakage of the liquid from the hydraulic pressure chamber of the cylinder can be prevented.

DESCRIPTION OF THE PREFERRED EMBODIMENTS

First Embodiment

Figure 1:
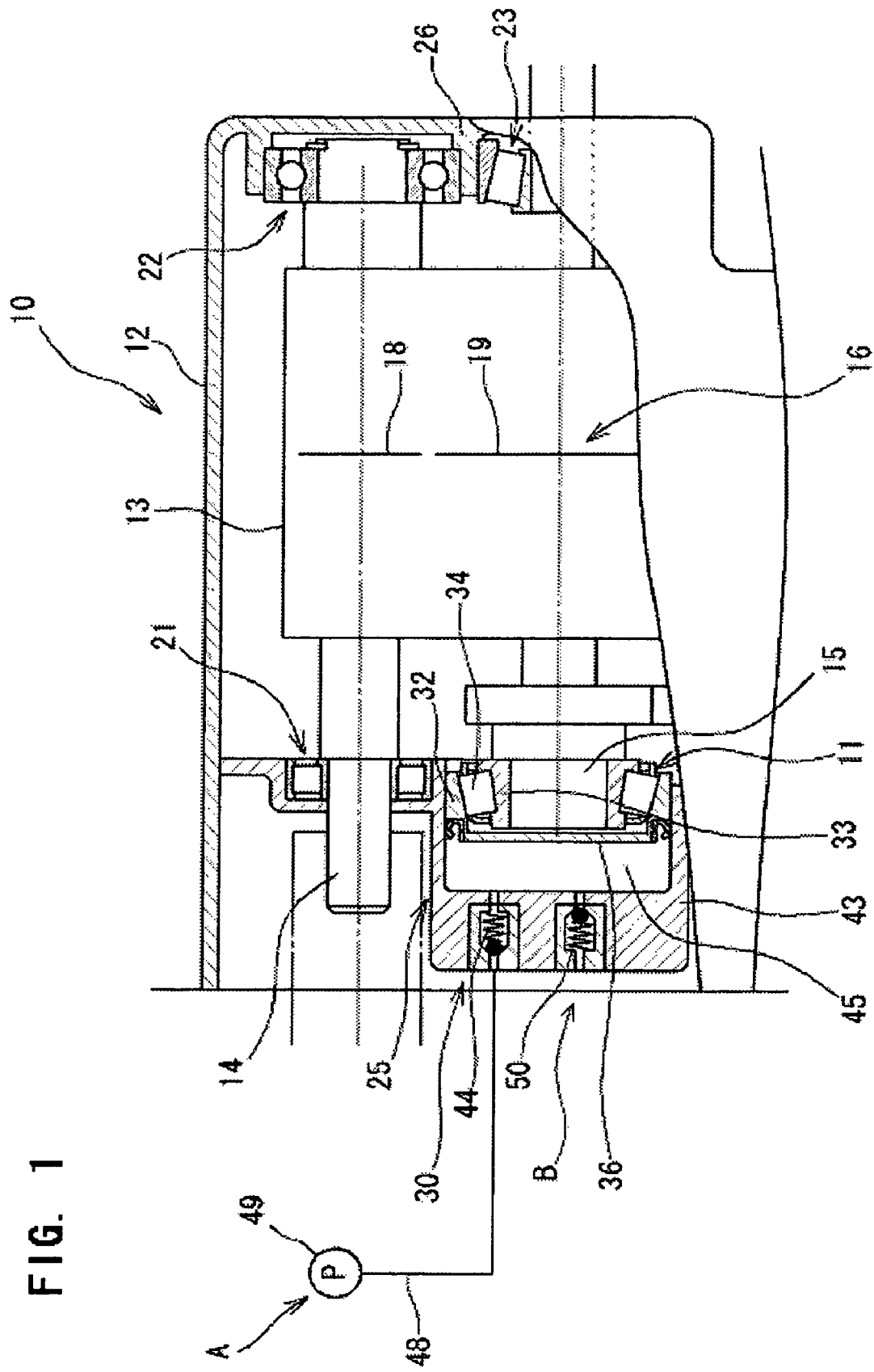
FIG. 1 is a cross-sectional view of a transmission incorporating a first embodiment of a rolling bearing apparatus of the present invention.

FIG. 1 is a cross-sectional view of a transmission incorporating a first embodiment of a rolling bearing apparatus of the present invention. This transmission comprises a case 12, a gear box 13 mounted within the case 12, and an input shaft 14 and an output shaft (rotation shaft) 15 extending through the gear box 13 and arranged parallel to each other. The input shaft 14 and the output shaft 15 are rotated in an interlocked manner by a speed change gear 16 within the gear box 13.

The speed change gear 16 is, for example, of the manual type, and in this speed change gear 16, a plurality of input gears 18 different in the number of teeth from one another are mounted on the input shaft 14, and a plurality of output gears 19 different in the number of teeth from one another are mounted on the output shaft 15. According to a change gear ratio to be obtained and the direction of movement (a forward movement or a reverse movement), a combination of meshing engagement of the gears 18 on the input shaft 14 with the gears 19 on the output shaft 15 is changed, thereby changing the speed. Spur gears and helical gears are used as these input gears 18 and the output gears 19. The speed change gear 16 may be of the automatic type using a planetary gear mechanism or the like.

Opposite end portions of the input shaft 14 are rotatably supported respectively by a cylindrical roller bearing 21 and a ball bearing 22 fixed to the inside of the case 12. Opposite end portions of the output shaft 15 are supported respectively by a first tapered roller bearing 11 (disposed at one side (left side) in an axial direction) and a second tapered roller bearing 23 (disposed at the other side in the axial direction). The first tapered roller bearing 11 is fitted in a first housing 25 formed integrally with the case 12, and the second tapered roller bearing 23 is fitted in a second housing 26 formed integrally with the case 12, and is fixed thereto. A preload directed inward in the axial direction (in the right direction) is applied to the first tapered roller bearing 11 by preload holding means 30. This preload holding means 30 will hereafter be described in detail.

Figure 2:
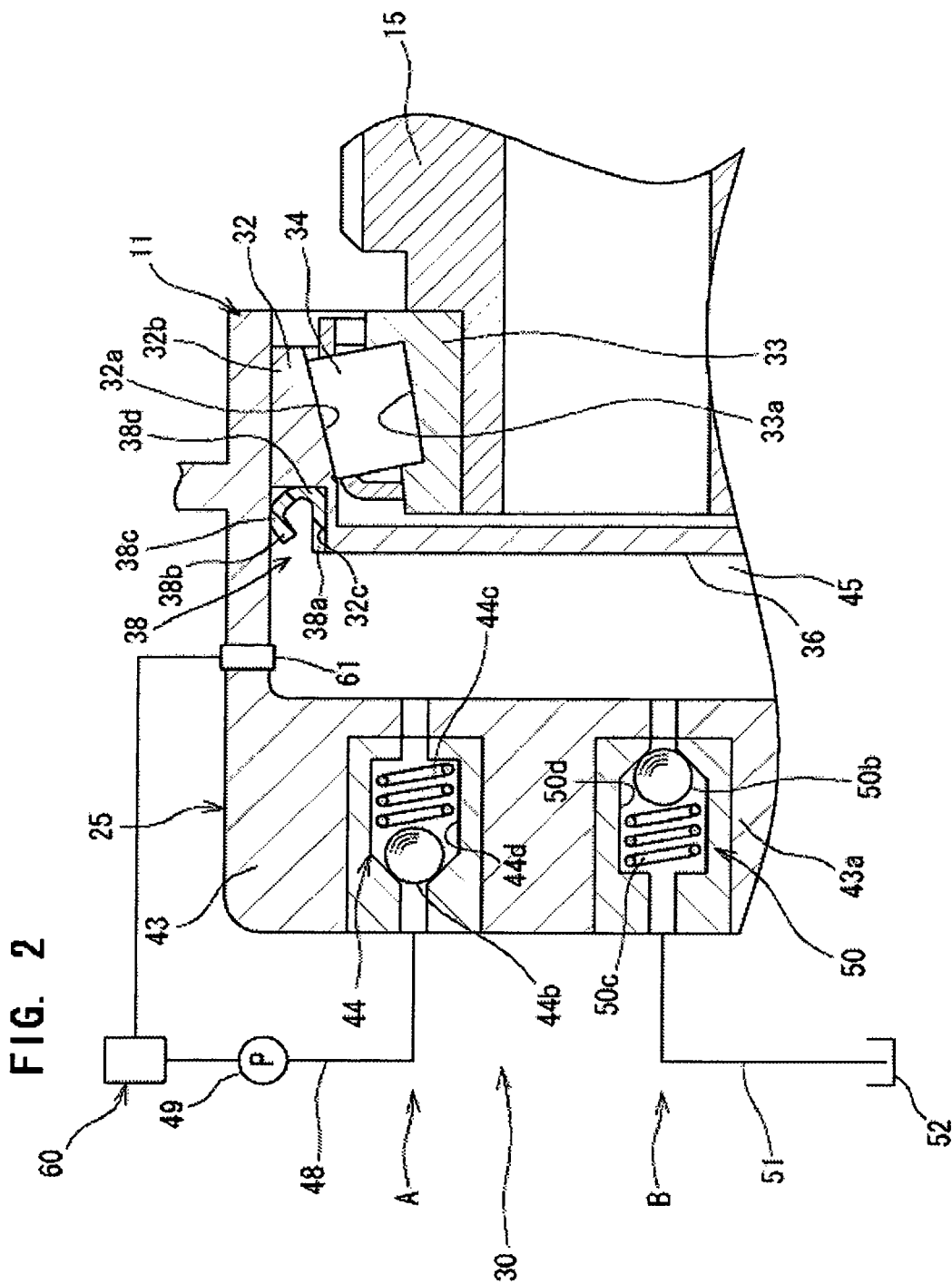
FIG. 2 is an enlarged cross-sectional view of an important portion of the rolling bearing apparatus of the first embodiment.

FIG. 2 is a cross-sectional view showing an important portion of the invention on an enlarged scale. As shown in this Figure, the first tapered roller bearing 11 comprises an outer ring 32, an inner ring 33, and a plurality of tapered rollers (rolling elements) 34 disposed between the outer ring 32 and the inner ring 33. An outer peripheral surface of the outer ring 32 is fitted in an inner peripheral surface of the first housing 25, and an inner periphery raceway surface 32a is formed on an inner peripheral surface of the outer ring 32, and the tapered rollers 34 roll on this raceway surface 32a in inclinedly contacting relation thereto. An outer periphery raceway surface 33a is formed on an outer peripheral surface of the inner ring 33, and the tapered rollers 34 roll on this raceway surface 33a in inclinedly contacting relation thereto. The output shaft 15 is fitted in an inner peripheral surface of the inner ring 33. A contact angle between the inner ring 33 and the tapered rollers 34 as well as a contact angle between the outer ring 32 and the tapered rollers 34 is so set that the diameter is increasing from the axially inward side (the right side) toward the axially outward side (the left side). Here, the contact angle corresponds to "a nominal angle of contact" defined in JISB0104-1991.

A closure member (end member) 36 is provided at the outer ring 32 of the first tapered roller bearing 11. This closure member 36 is formed integrally with the outer ring 32 at an axially outer end portion (left end portion) of the outer ring 32 to close an opening of the outer ring 32. Therefore, the outer ring 32 is configured such that its axially outer end portion has a solid structure, and the outer ring 32 is open only at its axially inner end.

The axially outer end portion of the outer ring 32 has a reduced diameter, and a seal member 38 is fitted on an outer peripheral surface of this reduced-diameter portion 32c.

The seal member 38 is a pressure-resistant seal made of reinforced rubber. This seal member 38 includes a cylindrical portion 38a fitted on the outer peripheral surface of the reduced-diameter portion 32c, and a lip portion 38b projecting radially outwardly from the cylindrical portion 38a. The seal member 38 is preferably made of a rubber material capable of achieving both required mechanical strength and oil resistance, and suitable examples thereof include nitrile rubber (particularly, nitrile hydride rubber), acrylic rubber, silicone rubber and fluoro rubber.

The lip portion 38b includes an annular (ring-shaped) portion 38d extending radially outwardly from an axially inner end (right end) of the cylindrical portion 38a, and an abutment portion 38c extending axially outwardly (left) from a radially outer end (outer peripheral edge) of the annular portion 38d. An outer peripheral surface of the abutment portion 38c has a mountain-like cross-section such that its distal end portion is tapering outward in the axial direction. The lip portion 38b is elastically deformed radially inwardly, and is pressed against the inner peripheral surface of the first housing 25. The lip portion 38b is not limited to this configuration, and may have such a shape that it extends from the cylindrical portion 38a generally linearly radially outward and axially outwardly, that is, generally linearly obliquely.

The outer ring 32 of the first tapered roller bearing 11 has a first linear expansion coefficient. On the other hand, the first housing 25 has a second linear expansion coefficient larger than the first linear expansion coefficient. The output shaft 15 has a third linear expansion coefficient smaller than the second linear expansion coefficient. For example, the outer ring 32, the inner ring 33 and the rolling elements 34 of the first tapered roller bearing 11 are all made of steel (for example, bearing steel, case hardened steel or carburizing steel). The first housing 25 is made of light metal (comprising at least 50 mass % of Al or Mg as a main component), and the output shaft 15 is made of steel (for example, carbon steel for machine construction). Preferably, the first housing 25 is made of Al or an Al alloy from the viewpoints of workability and a corrosion resistance, and for example, an Al alloy for die casting is used as this Al alloy. In this embodiment, the case 12 (FIG. 1) is also made of an Al alloy, and the first housing 25 is formed integrally on the inner surface of the case 12.

The linear expansion coefficient (the second linear expansion coefficient) of Al which is the main component of the first housing 25 is 23 to 24 ppm/° C., and the linear expansion coefficient (the first and third linear expansion coefficients) of Fe which is main components of the output shaft 15 and the first tapered roller bearing 11 are about 12 to about 13 ppm/° C. Generally, the temperature of an environment in which a bearing is used in a transmission of an automobile is in the range of from −40° C. to 150° C. (The temperature which the bearing ordinarily reaches is in the range of from 50° C. to 80° C. except in cold districts and expect a high-speed continuous operation.).

The above-mentioned preload holding means 30 imparts an axially inwardly-directed preload to the first tapered roller bearing 11. This preload holding means 30 comprises a cylinder 43 of a bottom-closed cylindrical shape provided at the first housing 25, a hydraulic fluid supply mechanism A connected to the cylinder 43 so as to supply a hydraulic fluid into the cylinder 43, and a hydraulic fluid discharge mechanism B for discharging the hydraulic fluid from the cylinder 43.

A larger-diameter portion 32b of the outer ring 32 is fitted in an inner periphery of the cylinder 43 so as to slide in the axial direction, and a space formed by an inner surface of the cylinder 43 and the closure member 36 of the outer ring 32 serves as a pressure chamber 45 which can be sealed by the seal member 38. A solid lubricant is coated on the outer peripheral surface of the outer ring 32 so that the outer ring 32 can slide smoothly. As the solid lubricant, for example, a fluororesin such as polytetrafluoroethylene, molybdenum disulfide, graphite, molybdenum, or a resin having one or more of these substances dispersed therein can be used.

The hydraulic fluid supply mechanism A comprises a fluid supply passage 48, a hydraulic pump 49 (serving as a pressure source) connected to the pressure chamber 45 via the fluid supply passage 48, a check valve 44 provided at that portion of the fluid supply passage 48 disposed between the hydraulic pump 49 and the pressure chamber 45, and a fluid supply control portion 60 for controlling the supply of the fluid by the hydraulic pump 49 and the stop of this supply.

In this embodiment, the check valve 44 is provided in a bottom wall 43a of the cylinder 43, and comprises a first check ball 44b movable within an internal space (first internal space) 44d of the check valve along the flow passage, and a first urging member 44c urging the first check ball 44b axially outwardly with a first set pressure.

The first urging member 44c comprises a compression coil spring, and the first set pressure thereof is determined by specifications such as the volume and shape of the pressure chamber 45, the type and size of the bearing, etc. The first check ball 44b is pushed and moved axially outwardly by the first urging member 44c, and closes a left end portion (a hole of the fluid supply passage 48) of the first internal space 44d. When a hydraulic fluid with a pressure larger than the first set pressure is supplied from the hydraulic pump 49, the first check ball 44b is moved axially inwardly against the bias of the first urging member 44c, thereby allowing the first internal space 44d to communicate with the hydraulic pump (49)-side fluid supply passage 48, so that the hydraulic fluid flows into the pressure chamber 45. In other words, the first set pressure is a maximum pressure chamber-side pressure at which the first urging member 44c yields to the hydraulic pressure of the hydraulic fluid loaded on the check valve 44b from the hydraulic pump 49, and allows the first check ball 44b to move axially inwardly, and this first set pressure is substantially based on the difference between the fluid pressure of the hydraulic fluid supplied from the hydraulic pump 49 and a minimum differential pressure (a) required when communicating the check valve 44.

When the hydraulic fluid is thus supplied to the pressure chamber 45 via the fluid supply passage 48 and the check valve 44 by the hydraulic pump 49, the outer ring 32 is very slightly moved axially inwardly, thus applying a preload. The outer ring 32 receives component forces from the inclined rolling contact surfaces of the tapered rollers 34, and is displaced axially and radially, and the outer peripheral surface of the outer ring 32 is pressed against the inner peripheral surface of the cylinder 43, so that the radial preload is supported.

The hydraulic fluid discharge mechanism B comprises a relief valve 50 provided in the bottom wall 43a of the cylinder 43, and a discharge passage 51 connecting the pressure chamber 45 to an oil tank 52 via the relief valve 50. This relief valve 50 comprises a second check ball 50b movable within an internal space (second internal space) 50d of this relief valve, and a second urging member 50c urging the second check ball 50b axially inwardly with a second set pressure. Namely, the relief valve 50 is one which is identical in basic construction to the check valve 44 and is disposed such that a hydraulic fluid discharge direction and a hydraulic fluid inflow direction are reversed in the right-left direction.

The second set pressure is larger than the first set pressure. The second check ball 50b is pressed by the second urging member 50b, and is moved axially inwardly to close a right end portion (a hole of the discharge passage 51) of the second internal space 50d. When the pressure within the pressure chamber 45 exceeds the second set pressure, the second check ball 50b is moved axially outwardly to allow the pressure chamber 45 to communicate with the second internal space 50d, and the hydraulic fluid in the pressure chamber 45 is recovered by the oil tank 52 via the discharge passage 51. In other words, the second set pressure is a minimum pressure chamber (45)-side pressure at which the second urging member 50c yields to the pressure of the hydraulic fluid loaded on the relief valve 50 from the pressure chamber 45, and allows the second check ball 50b to move axially outwardly, and this second set pressure is substantially based on the sum of the discharge-side fluid pressure (which is, in this embodiment, a pressure within the oil tank 52, and is the atmospheric pressure) and a minimum differential pressure (b) required when communicating the relief valve 50. Incidentally, in the case where the hydraulic fluid is the same as a lubricant of the transmission, the hydraulic fluid may be discharged into the transmission by the hydraulic fluid discharge mechanism B. In this case, the second set pressure is the sum of a pressure within the transmission and the minimum differential pressure (b) required when communicating the relief valve 50.

The second set pressure is larger than the first set pressure, and therefore the pressure within the pressure chamber 45 is maintained at a level between the first set pressure and the second set pressure by the functions of the check valve 44 and relief valve 50.

The fluid supply control portion 60 includes a sensor 61 for detecting the hydraulic pressure within the pressure chamber 45, and the hydraulic pump 49 can be driven and stopped in accordance with a detection signal from this sensor 61. Namely, when the sensor 61 detects that the hydraulic pressure within the pressure chamber 45 becomes smaller than the first set pressure, the fluid supply control portion 60 drives the hydraulic pump 49 to thereby supply the hydraulic fluid to the pressure chamber 45 via the check valve 44. Also, when the sensor 61 detects that the hydraulic pressure within the pressure chamber 45 becomes larger than a third set pressure which is larger than the first set pressure but is smaller than the second set pressure, the fluid supply control portion 60 stops the driving of the hydraulic pump 49, thereby stopping the supply of the hydraulic fluid to the pressure chamber 45. In this case, the hydraulic pressure applied from the hydraulic pump 49 to the check valve 44 need to be more than the sum of the third set pressure and the minimum pressure a required when communicating the check valve 44. By doing so, the hydraulic pressure of the hydraulic fluid within the pressure chamber 45 is generally more than the third set pressure. When the pressure of the hydraulic fluid within the pressure chamber 45 is larger than the second set pressure, the hydraulic fluid is discharged from the relief valve 50, and the sensor 61 detects that the hydraulic pressure within the pressure chamber 45 becomes larger than the third set pressure which is smaller than the second set pressure, and therefore the driving of the hydraulic pump 49 is stopped. Therefore, preferably, in order to eliminate the unnecessary driving of the hydraulic pump 49, the maximum value of the hydraulic fluid loaded on the check valve 44 from the hydraulic pump 49 is smaller than the second set pressure. The third set pressure may be equal to the first set pressure.

When the temperature of the transmission, having the rolling bearing apparatus 10 of the above construction incorporated therein, is kept at a relatively low and constant temperature, the difference in dimensional change (due to thermal expansion) between the first housing 25, the outer ring 32 and the output shaft 15 is very slight, and the preload is also kept constant. At this time, the hydraulic fluid has been supplied to the pressure chamber 45, and the hydraulic pressure of this hydraulic fluid is maintained at a level between the first set pressure and the second set pressure, and the driving of the hydraulic pump 49 has been stopped by the fluid supply control portion 60.

When the temperature of the transmission rises, the transmission, the first housing 25 and the second housing 26 are considerably expanded in the axial direction since the transmission, the first housing 25 and the second housing 26 are larger in linear expansion coefficient than the output shaft 15, and the outer ring 32 tends to be separated from the tapered rollers 34.

Also, since the first housing 25 is larger in linear expansion coefficient than the first tapered roller bearing 11, the inner peripheral surface of the first housing 25 (that is, the cylinder 43) increases in diameter, and tends to be separated from the outer peripheral surface of the outer ring 32. Namely, the position at which the outer peripheral surface of the outer ring 32 is supported by the inner peripheral surface of the first housing 25 is changed radially outwardly, so that a reaction force applied from the first housing 25 to the outer ring 32 is reduced.

As a result, the outer ring 32 is pressed axially inwardly by the hydraulic pressure within the pressure chamber 45, and is moved into a position where the preload applied to the outer ring 32 is balanced with the reaction force applied from the first housing 25. As a result, even when the position at which the outer peripheral surface of the outer ring 32 is supported is changed, the preload acting on the outer ring 32 is kept generally constant. When the hydraulic pressure within the pressure chamber 45 becomes lower than the first set pressure in accordance with the above movement of the outer ring 32, the fluid supply control portion 60 drives the hydraulic pump 49 is operated to thereby supply the hydraulic fluid to the pressure chamber 45. When the hydraulic pressure within the pressure chamber 45 reaches the third set pressure, the fluid supply control portion 60 stops the driving of the hydraulic pump 49, thereby stopping the supply of the hydraulic fluid.

Thus, in the rolling bearing apparatus 10, only when the pressure within the pressure chamber 45 decreases, the hydraulic pump 49 is driven, thereby maintaining the pressure within the pressure chamber 45 at the level between the first set pressure and the third set pressure. Therefore, as compared with the type of apparatus in which the hydraulic pump 49 is always driven so as to maintain the pressure of the pressure chamber 45, energy required for driving the hydraulic pump 49 can be reduced.

Furthermore, when the inner peripheral surface of the first housing 25 increases in diameter, and is separated from the outer peripheral surface of the outer ring 32, the lip portion 38b of the seal member 38 provided at the outer ring 32 follows the inner peripheral surface of the first housing 25, and is elastically restored, and maintains a press-contacted (intimately contacted) condition relative to the inner peripheral surface of the first housing 25. Therefore, the hydraulic fluid hardly leaks through a clearance between the inner peripheral surface of the first housing 25 and the outer peripheral surface of the outer ring 32, and the preload can be maintained.

When the temperature of the transmission decreases after the operation of the transmission is stopped, the first housing 25 is thermally contracted axially and radially, and the pressure chamber 45 is reduced. As a result, the hydraulic fluid within the pressure chamber 45 is pressurized, so that the excessive preload tends to be applied to the first tapered roller bearing 11. However, when the pressure within the pressure chamber 45 becomes more than the second set pressure, the relief valve 50 of the hydraulic fluid discharge mechanism B is opened to cause the pressure chamber 45 to communicate with the discharge passage 51, and the hydraulic fluid is discharged from the pressure chamber 45, so that the pressure within the pressure chamber 45 is kept at the proper level. At this time, the hydraulic fluid is prevented by the check valve 44 from flowing reversely into the hydraulic pump 49.

Thus, even when the temperature of the rolling bearing apparatus 10 decreases, the pressure within the pressure chamber 45 is maintained at the second set pressure by the function of the relief valve 50, and therefore the pressure within the pressure chamber 45 is prevented from excessively increasing.

The first set pressure is the pressure necessary for applying a generally minimum preload of the predetermined range of preload to be applied to the first tapered roller bearing 11, and the second set pressure is the pressure necessary for applying a generally maximum preload of the predetermined the range of preload to be applied to the first tapered roller bearing 11.

Furthermore, when an impact load or the like is applied to the output shaft 15 in the direction opposite to the preload-applying direction (that is, in the axially outward direction) upon gear changing of the transmission, engagement/disengagement of a clutch (not shown), etc., the outer ring 32 is moved axially against the hydraulic pressure within the pressure chamber 45 via the inner ring 33 and the tapered rollers 34, and this leads to a fear that an excessive preload may be applied to the first tapered roller bearing 11. Even in this case, however, the hydraulic fluid discharge mechanism B properly functions, and discharges the hydraulic fluid within the pressure chamber 45, thereby preventing such an excessive preload from being applied to the first tapered roller bearing 11. In this case, although the hydraulic pressure within the pressure chamber 45 is instantaneously increased, the reverse flow of the hydraulic fluid to the hydraulic pump 49 is prevented by the function of the check valve 44.

Furthermore, even when the pressure within the pressure chamber 45 is instantaneously increased upon application of an impact load, the hydraulic fluid will not leak through a clearance between the inner peripheral surface of the first housing 25 and the outer peripheral surface of the outer ring 32 since the seal member 38 comprising the pressure-resistant seal is provided at the outer ring 32.

On the other hand, in the case where the rolling bearing apparatus 10 is used in an automatic transmission, and this transmission is constructed such that part of a hydraulic fluid used for the hydraulic control of the transmission is supplied to the pressure chamber 45, it is necessary to increase a discharge of a hydraulic pump for the transmission by an amount corresponding to the amount of the hydraulic fluid to be supplied to the pressure chamber. However, after the hydraulic pressure within the pressure chamber 45 once becomes larger than the third set pressure, the hydraulic fluid does not need to be supplied to the pressure chamber 45, and therefore by controlling the supply of this hydraulic pressure by a control valve or the like, the amount of supply of the hydraulic fluid by the hydraulic pump can be reduced. Therefore, energy required for driving the hydraulic pump can be reduced.

The closure member 36 can be separate from the outer ring 32. However, when the outer ring 32 and the closure member 36 are formed integrally with each other as in this embodiment, the rigidity of the outer ring 32 is increased, and therefore even when a clearance develops between the inner peripheral surface of the first housing 25 and the outer peripheral surface of the outer ring 32 in accordance with a temperature rise of the transmission, the deformation of the raceway surface out of roundness can be suppressed, and the bearing ability can be maintained. Also, in the case where the outer ring 32 and the closure member 36 are separate from each other, the outer ring 32 and the closure member 36 are liable to be inclined separately from each other when the diameter of the inner peripheral surface of the first housing 25 increases, and there is a fear that the outer ring 32 and the closure member 36 are displaced relative to each other, and are subjected to wear by rubbing. However, by forming the outer ring 32 and the closure member 36 integrally with each other, this disadvantage can be avoided.

In the above embodiment, although the sensor 61 for detecting the hydraulic pressure within the pressure chamber 45 is provided at the pressure chamber 45, this sensor 61 may be provided at that portion of the fluid supply passage 48 disposed between the check valve 44 (more specifically, the first check ball 44b) and the pressure chamber 45, or may be provided at that portion of the discharge passage 51 disposed between the relief valve 50 (more specifically, the second check ball 50b) and the pressure chamber 45. By thus providing the sensor 61 in either of the above positions, the hydraulic pressure within the pressure chamber 45 can be detected.

In the above embodiment, although the check valve 44 is formed by the first check ball 44b, the first urging member 44c and the first internal space 44d, it may be replaced by a solenoid valve. In this case, when the sensor 61 detects the fact that the pressure within the pressure chamber 45 is below the first set pressure, the hydraulic pump 49 is driven, and also the solenoid valve is opened, and by doing so, the hydraulic pressure within the pressure chamber 45 can be maintained at the level above the first set pressure. Furthermore, the system can be constructed such that when the sensor detects a pressure at least larger than the first set pressure or preferably larger than the third set pressure, the solenoid valve is closed. With this construction, when an impact load or the like is applied, and the hydraulic pressure within the pressure chamber 45 instantaneously increases so as to apply an excessive preload to the first tapered roller bearing, the reverse flow of the hydraulic fluid to the hydraulic pump 49 can be prevented.

The present invention is not limited to the above embodiment, and suitable modifications can be made. For example, the above embodiment is directed to the rolling bearing apparatus used in the transmission, but the invention can be applied to other apparatuses such as a gear unit of a drive distribution shaft for a four-wheel drive vehicle.

Furthermore, the rolling bearing is not limited to the tapered roller bearing, and may be any other suitable rolling bearing utilizing a preload, such as an angular contact ball bearing, a deep groove ball bearing, etc.

Second Embodiment

Figure 3:
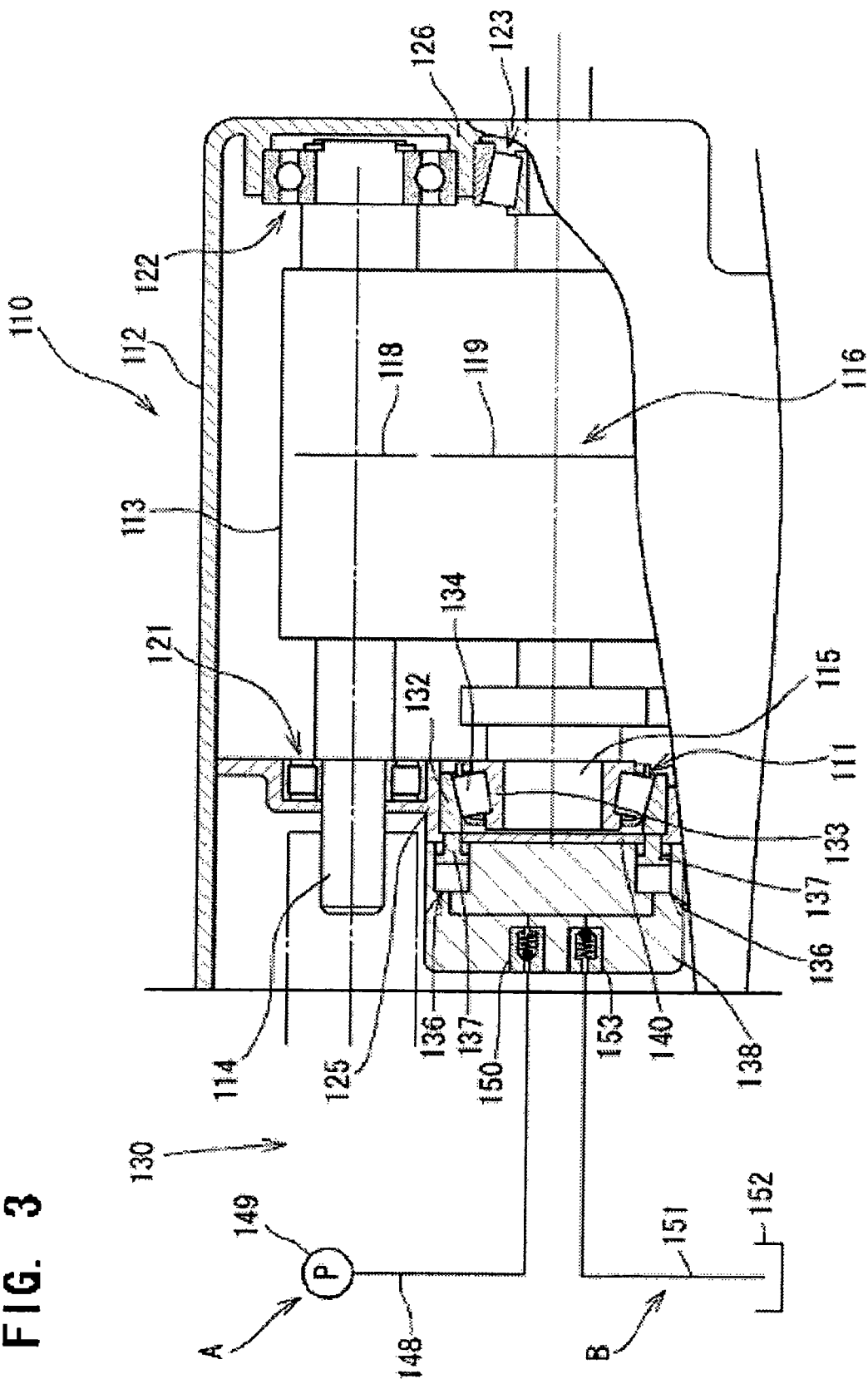
FIG. 3 is a cross-sectional view of a transmission incorporating a second embodiment of a rolling bearing apparatus of the invention.

FIG. 3 is a side cross-sectional view showing a second embodiment of a rolling bearing apparatus of the invention. This rolling bearing apparatus is formed by incorporating a rolling bearing 111 in a transmission 110. The transmission 110 comprises a case 112, a gear box 113 mounted within the case 112, and an input shaft 114 and an output shaft (rotation shaft) 115 extending through the gear box 113 and arranged parallel to each other. The input shaft 114 and the output shaft 115 are rotated in an interlocked manner by a speed change gear 116 within the gear box 113.

The speed change gear 116 is, for example, of the manual type, and in this speed change gear 116, a plurality of input gears 118 different in the number of teeth from one another are mounted on the input shaft 114, and a plurality of output gears 119 different in the number of teeth from one another are mounted on the output shaft 115. According to a change gear ratio to be obtained and the direction of movement (a forward movement or a reverse movement), a combination of meshing engagement of the gears 118 on the input shaft 114 with the gears 119 on the output shaft 115 is changed, thereby changing the speed. Spur gears and helical gears are used as these input gears 118 and the output gears 119. The speed change gear 116 may be of the automatic type using a planetary gear mechanism or the like.

Opposite end portions of the input shaft 114 are rotatably supported respectively by a cylindrical roller bearing 121 and a ball bearing 122 fixed to the inside of the case 112. Opposite end portions of the output shaft 115 are supported respectively by tapered roller bearings 111 and 123. The tapered roller bearing (first tapered roller bearing) 111 disposed at one side (left side) in an axial direction is fitted in a housing 125 formed integrally with the case 112, and the tapered roller bearing (second taper roller bearing) 123 disposed at the other side in the axial direction is fitted in a housing 126 formed integrally with the case 112, and is fixed thereto. A preload directed inward in the axial direction (in the right direction) is applied to the left tapered roller bearing 111 by a preload applying unit 130. This preload applying unit 130 will hereafter be described in detail.

Figure 4:
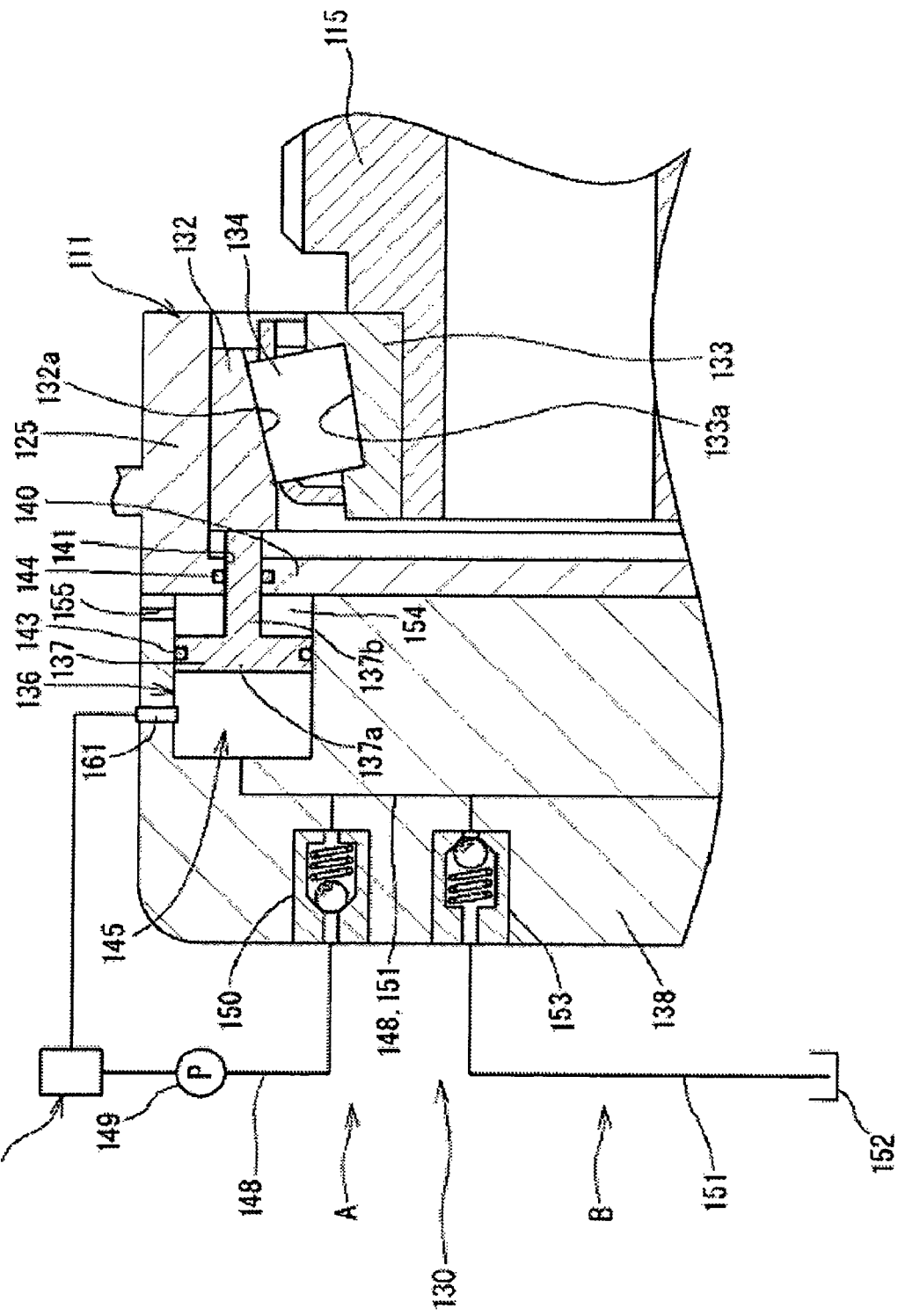
FIG. 4 is an enlarged cross-sectional view of an important portion of the rolling bearing apparatus of the second embodiment.
Figure 5A:
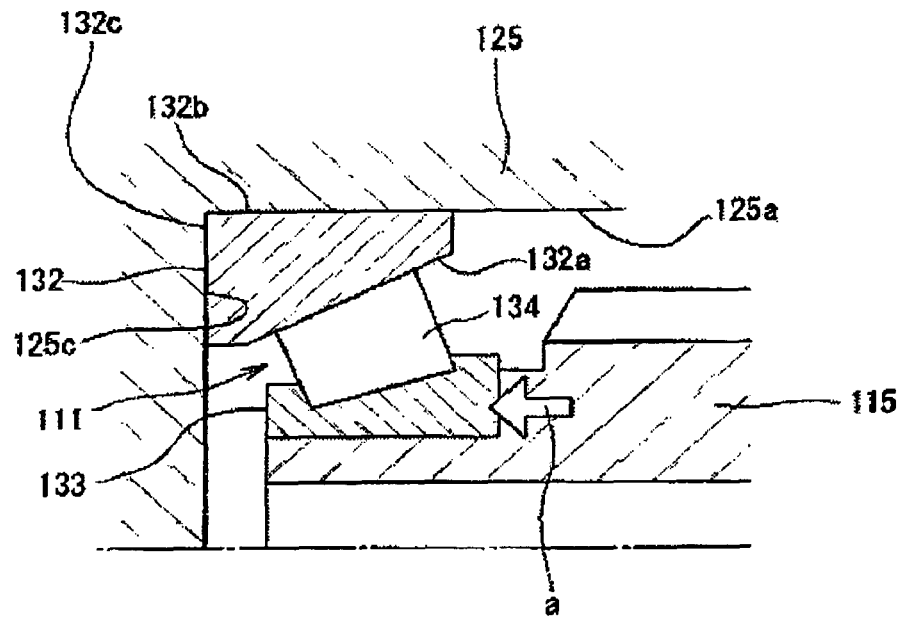
FIGS. 5A and 5B are enlarged cross-sectional views of an important portion of a conventional rolling bearing apparatus.
Figure 5B:
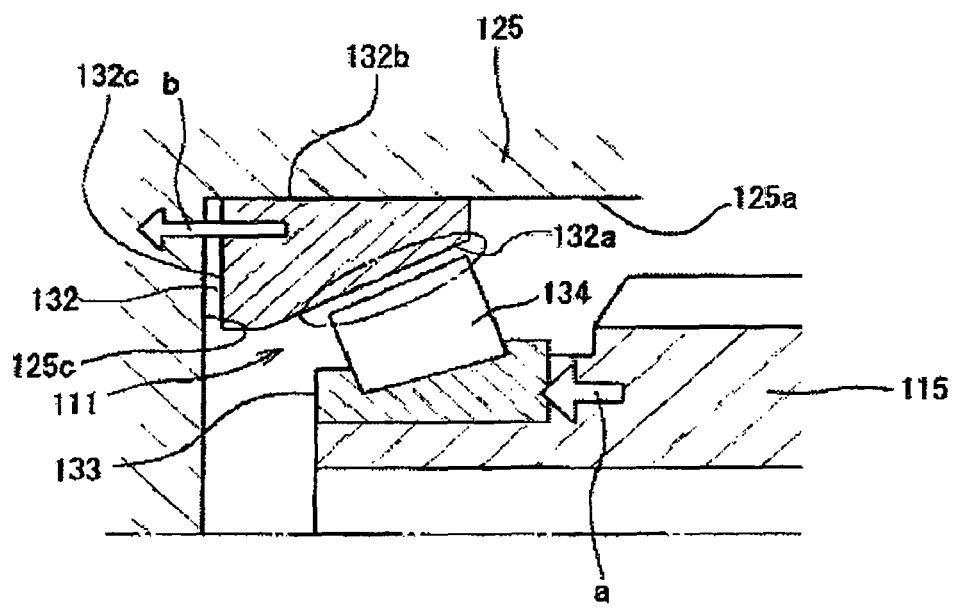

FIG. 4 is a cross-sectional view showing an important portion of the invention on an enlarged scale. The left tapered roller bearing 111 comprises an outer ring 132, an inner ring 133, and a plurality of tapered rollers (rolling elements) 134 disposed between the outer ring 132 and the inner ring 133. An outer peripheral surface of the outer ring 132 is fitted in an inner peripheral surface of the housing 125, and an inner periphery raceway surface 132a is formed on an inner peripheral surface of the outer ring 132, and the tapered rollers 134 roll on this raceway surface 132a in inclinedly contacting relation thereto. An outer periphery raceway surface 133a is formed on an outer peripheral surface of the inner ring 133, and the tapered rollers 134 roll on this raceway surface 133a in inclinedly contacting relation thereto. The output shaft 115 is fitted in an inner peripheral surface of the inner ring 133. A contact angle between the inner ring 133 and the tapered rollers 134 as well as a contact angle between the outer ring 132 and the tapered rollers 134 is so set that the diameter is increasing from the axially inward side (the right side) toward the axially outward side (the left side). Here, the contact angle corresponds to "a nominal angle of contact" defined in JISB0104-1991.

The construction of the right tapered roller bearing 123 (FIG. 3) is similar to this construction of the left tapered roller bearing 111 except that the axially inward side is the left side, while the axially outward side is the right side.

The outer ring 132 of the left tapered roller bearing 111 is fitted in the inner peripheral surface of the housing 125 so as to slide in the axial direction. A solid lubricant is coated on the outer peripheral surface of the outer ring 132 so that the outer ring 132 can slide smoothly. As the solid lubricant, for example, a fluororesin such as polytetrafluoroethylene, molybdenum disulfide, graphite, molybdenum, or a resin having one or more of these substances dispersed therein can be used.

The outer ring 132 of the tapered roller bearing 111 has a first linear expansion coefficient. On the other hand, the housing 125 has a second linear expansion coefficient larger than the first linear expansion coefficient. The output shaft 115 has a third linear expansion coefficient smaller than the second linear expansion coefficient.

For example, the outer ring 132, the inner ring 133 and the rolling elements 134 of the tapered roller bearing 111 are all made of steel (for example, bearing steel, case hardened steel or carburizing steel). The housing 125 is made of light metal (comprising at least 50 mass % of Al or Mg as a main component), and the output shaft 115 is made of steel (for example, low alloy steel for machine construction). Preferably, the housing 125 is made of Al or an Al alloy from the viewpoints of workability and a corrosion resistance, and for example, an Al alloy for die casting is used as the Al alloy. In this embodiment, the case 112 (FIG. 3) is also made of an Al alloy, and the housing 125 is formed integrally on the inner surface of the case 112.

The linear expansion coefficient (the second linear expansion coefficient) of Al which is the main component of the housing 125 is 23 to 24 ppm/° C., and the linear expansion coefficient (the first and third linear expansion coefficients) of Fe which is main components of the output shaft 115 and the tapered roller bearing 111 are about 12 to about 13 ppm 1/° C. Generally, the temperature of an environment in which a bearing is used in a transmission of an automobile is in the range of from −40° C. to 150° C. (The temperature which the bearing ordinarily reaches is in the range of from 50° C. to 80° C. except in cold districts and expect a high-speed continuous operation.).

As shown in FIG. 3, the preload applying unit 130 imparts an axially inwardly-directed preload to the outer ring 132 of the tapered roller bearing 111. This preload applying unit 130 comprises cylinders 136 disposed axially outwardly of the outer ring 132 of the tapered roller bearing 111, pistons 137 provided respectively within the cylinders 136, and pressure supply means A connected to the cylinders 136 so as to supply a hydraulic pressure into the cylinders 136. The plurality of (more specifically, three or more) sets of cylinders 136 and pistons 137 are provided, and are arranged at equal intervals around the axis of the tapered roller bearing 111 (that is, in a circumferential direction). In FIG. 3, two sets of cylinders 136 and pistons 137 disposed respectively at the upper side and the lower side are shown.

A cylinder block 138 is formed at an axially outer end of the housing 125, and is coupled thereto. A plurality of holes are formed in the cylinder block 138 to provide the plurality of cylinders 136, respectively. The cylinder block 138 is made of the same material as that of the housing 125 or a material having a linear expansion coefficient generally equal to the linear expansion coefficient (the second linear expansion coefficient) of the housing 125. The cylinder block 138 is separate from the housing 125, and is connected to the housing 125 by bolts or the like. However, the cylinder block 138 may be formed integrally with the housing 125. The cylinder block 138 may be divided into a plurality of sections, and part of this cylinder block 138 may be formed integrally with the housing 125.

As shown in FIG. 4, a partition wall 140 is disposed between the cylinders 136 and the outer ring 132, and this partition wall 140 closes axially-inner openings of the cylinders 136 disposed close to the outer ring 132. Through holes 141 are formed through the partition wall 140, and the cylinders 136 communicate with the housing 125 via the respective through holes 141. An inner diameter of the through hole 141 is smaller than an inner diameter of the cylinder 136. In the illustrated embodiment of FIG. 4, although the partition wall 140 is formed integrally with the housing 125, this partition wall 140 may be formed integrally with the cylinder block 138, or may be separate from the housing 125 and the cylinder block 138, in which case the partition wall 140 is connected to the housing 125 or the cylinder block 138 by bolts or the like.

The piston 137 includes a pressure receiving portion 137a fitted in the cylinder 136 so as to slide in the axial direction, and a pressing portion 137b projecting axially inwardly (right) from the pressure receiving portion 137a and fitted in the through hole 141 so as to slide in the axial direction. A distal end of the pressing portion 137b abuts against an axially-outer end surface of the outer ring 132. An O-ring (first seal member) 143 is provided between an outer peripheral surface of the pressure receiving portion 137a and an inner peripheral surface of the cylinder 136. An O-ring (second seal member) 144 is also provided between an outer peripheral surface of the pressing portion 137b and an inner peripheral surface of the through hole 141. Each of the O-rings 143 and 144 is made of reinforced rubber, and preferably is made of a rubber material capable of achieving both required mechanical strength and oil resistance in view of contact of these O-rings with oil (hydraulic fluid) of the preload applying unit 130, etc., and suitable examples thereof include nitrile rubber (particularly, nitrile hydride rubber), acrylic rubber, silicone rubber and fluoro rubber.

A space formed by an axially-outer end surface of the pressure receiving portion 137a and the inner surface of the cylinder 136 serves as a pressure chamber (hydraulic pressure chamber) 145. A space formed by an axially-inner end surface of the pressure-receiving portion 137a and an axially-outer end surface of the partition wall 140 serves as an air chamber 154. This air chamber 154 communicates with the exterior of the cylinder 136 via a vent hole 155.

The pressure supply means A comprises a hydraulic pump 149 for supplying oil, a supply oil passage 148 connecting the hydraulic pump 149 to the cylinders 136, and a check valve 150 provided at the supply oil passage 148. A downstream-side portion of this supply oil passage 148 is formed in the cylinder block 138, and communicates with the cylinders 136. The check valve 150 is provided in the cylinder block 138, and comprises a check ball, an urging member, etc. This check valve 150 allows the oil of above a set pressure to flow from the hydraulic pump 149 into each pressure chamber 145, and prevents the flow of the oil in a reverse direction.

When the hydraulic pump 149 is operated to supply the oil to each pressure chamber 145 via the supply oil passage 148, the piston 137 is moved axially inwardly (right), and the pressing portion 137b of the piston 137 presses the outer ring 132 to apply a preload to this outer ring 132. The outer ring 132 receives component forces from inclined rolling contact surfaces of the tapered rollers 134, and is displaced axially and radially, and the outer peripheral surface of the outer ring 132 is pressed against the inner peripheral surface of the housing 125, so that the radial preload is supported.

The preload applying unit 130 is provided also with pressure discharge means B, and when the pressure within each pressure chamber 145 increases, so that the excessive preload is about to be applied to the tapered roller bearing 111, the pressure discharge means B discharges the oil from the pressure chamber 145 so as to relief the preload. This pressure discharge means B comprises a discharge oil passage 151 connecting the pressure chamber 145 of each cylinder 136 to an oil tank 152, and a relief valve 153 provided at the discharge oil passage 151. An upstream-side of the discharge oil passage 151 is connected to each cylinder 136 via a common oil passage formed in the cylinder block 138 and serving also as the upstream-side portion of the supply oil passage 148. The relief valve 153 is provided in the cylinder block 138, and comprises a check ball, an urging member, etc., and allows the oil of above a set pressure to flow from each pressure chamber 145 to the oil tank 152, and prevents the flow of the oil in a reverse direction. The set pressure of the relief valve 153 is higher than the set pressure of the check valve 150.

The operation of the hydraulic pump 149 is controlled by a control unit 160. The pressure within the pressure chamber 145 of each cylinder 136 is detected by a corresponding pressure sensor 161, and when this pressure is a predetermined pressure (hereinafter referred to as "reference pressure") in a pressure range which is higher than the set pressure of the check valve 150 and is lower than the set pressure of the relief valve 153, the operation of the hydraulic pump 149 is stopped by the control unit 160. On the other hand, when this pressure is lower than the set pressure of the check valve 150, the hydraulic pump 149 is driven by the control unit 160.

The operation of the rolling bearing apparatus of this embodiment will be described below.

As described above, the axial preload is applied to the outer ring 132 of the tapered roller bearing 111 by supplying the oil to the pressure chambers 145 from the hydraulic pump 149, and the outer peripheral surface of the outer ring 132 is pressed against the inner peripheral surface of the housing 125, and is supported by this inner peripheral surface. At this time, the preload can be applied uniformly to the outer ring 132 since the plurality of sets of cylinders 136 and pistons 137 are arranged at equal intervals in the circumferential direction.

When the temperature of the transmission 110 is kept at a relatively low and constant temperature, the difference in dimensional change (due to thermal expansion) between the housing 125, the outer ring 132 and the output shaft 115 is very slight, and the preload is also kept constant.

When the temperature of the transmission 110 rises, the transmission 110 and the housings 125 and 126 expand considerably in the axial direction, so that the outer ring 132 tends to be separated from the tapered rollers 134, since the transmission 110 and the housings 125 and 126 are higher in linear expansion coefficient than the output shaft 115.

And besides, since the housing 125 is higher in linear expansion coefficient than the tapered roller bearing 111, the inner peripheral surface of the housing 125 increases in diameter, and tends to be separated from the outer peripheral surface of the outer ring 132. Namely, the position at which the outer peripheral surface of the outer ring 132 is supported by the inner peripheral surface of the housing 125 is changed radially outwardly, so that a reaction force applied from the housing 125 to the outer ring 132 is reduced.

At this time, the outer ring 132 is pressed axially inwardly by the hydraulic pressure within the pressure chambers 145, and is moved into a position where the preload applied to the outer ring 132 is balanced with the reaction force applied from the housing 125. As a result, even when the position at which the outer peripheral surface of the outer ring 132 is supported is changed, the preload acting on the outer ring 132 is kept generally constant. When the hydraulic pressure within each pressure chamber 145 becomes lower than the set pressure of the check valve 150 in accordance with the above movement of the outer ring 132, the hydraulic pump 149 is operated to supply the oil to each pressure chamber 145 until the pressure within the pressure chamber 145 reaches the reference pressure, and then the operation of the hydraulic pump 149 is stopped.

The piston 137 is supported at two regions, that is, by the inner peripheral surface of the cylinder 136 and the inner peripheral surface of the through hole 141 through the O-rings 143 and 144, and therefore even when the cylinder 136 is thermally expanded by a temperature rise, the piston 137 will hardly be inclined within the cylinder 136. Therefore, the leakage of the oil from the pressure chamber 145 into the air chamber 154 through the O-rings 143 and 144 as a result of inclining of the piston 137 can be prevented, and also the intrusion of lubricating oil, particles resulting from worn portions, etc., from the housing into the air chamber 154 can be prevented.

When the volume of the air chamber 154 between the pressure receiving portion 137a and the partition wall 140 is changed in accordance with the movement of the piston 137, the air is introduced into and discharged from the air chamber 154 via the vent hole 155, so that the air pressure within the air chamber 145 is kept constant. Therefore, the oil within the pressure chamber 145 and the lubricating oil, particles resulting from worn portions, etc., within the housing 125 are prevented from being drawn into the air chamber 154, and in contrast dirt and others within the air chamber 154 are prevented from being discharged into the pressure chamber 145 and the housing 125.

Furthermore, the oil within each pressure chamber 145 and the lubricating oil within the housing 125 are liquids, and thereof if these liquids should intrude into the air chamber 154 through the O-rings 143 and 144, these liquids can be forced out to the exterior of the cylinder 136 via the vent hole 155 (communicating with the exterior of the cylinder 136) when the piston 137 is moved axially inwardly. Thus, the axially-inward movement of the piston 137 will not be prevented by the intruded liquid.

Each of the plurality of cylinders 136 is formed to correspond to part of the outer ring 132 of the tapered roller bearing 111, and is much smaller (in diameter) as compared with a cylinder of a conventional apparatus formed to correspond to the whole of a bearing. Therefore, the amount of dimensional change of the cylinder 136 due to thermal expansion caused by a temperature rise is small, and a dimensional change of a clearance between the cylinder 136 and the piston 137 is small, and therefore the sealing function of the O-rings 143 and 144 is properly maintained, and the leakage of the oil from the pressure chamber 145 can be positively prevented. And besides, the amount of the oil supplied to all of the cylinders 136 can be reduced as compared with the conventional apparatus.

Only when the pressure within each pressure chamber 145 decreases, the hydraulic pump 149 is driven to maintain the pressure of the pressure chamber 145 in the predetermined range. Therefore, energy required for driving the hydraulic pump 149 can be reduced as compared with the case where the hydraulic pump 149 is always driven.

When the temperature of the transmission 110 decreases, the housing 125 and the cylinder block 138 are thermally contracted axially and radially, and the pressure chamber 145 of each cylinder 136 is also reduced. As a result, the oil within the pressure chamber 145 is pressurized, so that an excessive preload tends to be applied to the tapered roller bearing 111. However, when the pressure within the pressure chamber 145 exceeds the set pressure of the relief valve 153, the relief valve 153 is opened to thereby discharge the oil within the pressure chamber 145, so that the pressure within the pressure chamber 145 is kept at the proper level, thereby preventing an excessive preload from being applied to the tapered roller bearing 111. At this time, the oil is prevented by the check valve 150 from flowing reversely to the hydraulic pump 49.

Furthermore, when an impact load or the like is applied to the output shaft 115 in the direction opposite to the preload-applying direction (that is, in the axially outward direction) upon gear changing of the transmission 110, engagement/disengagement of a clutch (not shown), etc., the outer ring 132 is moved axially outwardly against the hydraulic pressure within the pressure chambers 145 via the inner ring 133 and the tapered rollers 134 so as to apply an excessive preload to the tapered roller bearing 111. Even in this case, however, the pressure discharge means B properly functions, and discharges the oil within each pressure chamber 145, so that the pressure within the pressure chamber 145 is kept at the proper level, thereby preventing such an excessive preload from being applied to the tapered roller bearing 111.

The present invention is not limited to the above embodiment, and suitable modifications can be made.

For example, in the second embodiment, although the plurality of sets of cylinders 136 and pistons 137 are arranged circumferentially around the axis of the tapered roller bearing 111, an annular cylinder 136 having an axis coinciding with the axis of the tapered roller bearing 111 may be formed, in which case an annular pressure-receiving portion 137a is fitted in this cylinder 136 so as to slide in the axial direction, and a plurality of pressing portions 137b are formed on the pressure receiving portion 137 at intervals in the circumferential direction, and project from this pressure receiving portion 137. In another modified form of the invention, one cylinder 136 sized to correspond to the whole of the tapered roller bearing 111 can be formed coaxially with the tapered roller bearing 111, in which case a pressure receiving portion 137a and a pressing portion 137b of a piston fitted in this cylinder 136 are supported by O-rings 143 and 144, respectively.

In the second embodiment, although the relief valve 153 is used as the pressure discharge means B of the preload applying unit 130, it may be replaced, for example, by a solenoid valve which is opened and closed in response to detected values of each sensor 161.

The second embodiment is directed to the rolling bearing apparatus used in the transmission, but the invention can be applied to other apparatuses such as a gear unit of a drive distribution shaft for a four-wheel drive vehicle. Furthermore, the rolling bearing is not limited to the tapered roller bearing, and may be any other suitable rolling bearing utilizing a preload, such as an angular contact ball bearing, a deep groove ball bearing, etc.

What is claimed is:

1. A rolling bearing apparatus comprising:
   rolling elements;
   an outer ring including a raceway surface formed at an inner periphery thereof and comprising a first linear expansion coefficient, the rolling elements rolling on the raceway surface, the raceway surface receiving from the rolling elements a radial load and a load directed toward one side in an axial direction;
   an inner ring including a raceway surface formed at an outer periphery thereof, the rolling elements rolling on the raceway surface of the inner ring, the inner ring being incorporated in the outer ring through the rolling elements in a preload-applied condition;
   a housing in which an outer peripheral surface of the outer ring is fitted such that the outer ring can be moved in the axial direction, the housing comprising a second linear expansion coefficient larger than the first linear expansion coefficient;
   a rotation shaft which is fitted in an inner peripheral surface of the inner ring, and comprises a third linear expansion coefficient smaller than the second linear expansion coefficient;
   a pressure chamber formed as a sealable space between the housing and an end portion of the outer ring at one side in the axial direction; and
   a preload holding unit that applies a fluid pressure to the pressure chamber to move the outer ring toward the other side in the axial direction to suppress decrease of the preload due to thermal expansion of the housing, wherein the preload holding unit includes:
- a pressure source connected to the pressure chamber via a fluid supply passage;
- a check valve which is provided at a portion of the fluid supply passage disposed between the pressure chamber and the pressure source, and allows a fluid to flow into the pressure chamber if a pressure of the fluid is higher than a first set pressure;
- a relief valve provided at a discharge passage so as to discharge the fluid from the pressure chamber if the pressure in the pressure chamber becomes higher than a second set pressure which is higher than the first set pressure and to close the discharge passage if the pressure in the chamber is lower than or equal to the second set pressure; and
- a fluid supply control portion which supplies the fluid to the pressure chamber from the pressure source via the check valve if the pressure within the pressure chamber becomes lower than the first set pressure, and stops the supply of the fluid from the pressure source when the pressure within the pressure chamber becomes larger than a third set pressure which is higher than the first set pressure but is lower than the second set pressure.

2. The rolling bearing apparatus according to claim 1, wherein an end member forming a part of the pressure chamber closes an opening of the end portion of the outer ring.

3. The rolling bearing apparatus according to claim 2, wherein the end member is formed integrally with the outer ring.

4. The rolling bearing apparatus according to claim 2, wherein the end member and at least a portion of the end portion of the outer ring are integrally formed as a single member.

5. The rolling bearing apparatus according to claim 1, wherein the relief valve comprises a check ball movable within an internal space of the relief valve, an urging member urging the check ball axially inward with the second set pressure.

6. A rolling bearing apparatus comprising:
- roiling elements;
- an outer ring including a raceway surface formed at an inner periphery thereof and comprising a first linear expansion coefficient, the rolling elements rolling on the raceway surface, the raceway surface receiving from the rolling elements a radial load and a load directed toward one side in an axial direction;
- an inner ring including a raceway surface formed at an outer periphery thereof, the rolling elements rolling on the raceway surface of the inner ring, the inner ring being incorporated in the outer ring through the rolling elements;
- a housing in which an outer peripheral surface of the outer ring is fitted such that the outer ring can be moved in the axial direction, the housing comprising a second linear expansion coefficient larger than the first linear expansion coefficient;
- a rotation shaft which is fitted in an inner peripheral surface of the inner ring, and comprises a third linear expansion coefficient smaller than the second linear expansion coefficient; and
- a preload applying unit that applies to the outer ring a preload directed toward the other side in the axial direction by a hydraulic pressure, wherein the preload applying unit includes:
- a cylinder disposed further toward the one side in the axial direction than the outer ring;
- a partition wall which is interposed between the cylinder and the outer ring to close an opening of the cylinder disposed close to the outer ring;
- a through hole which is formed through the partition wall such that the cylinder and the housing communicate with each other through the through hole;
- a piston including a pressure receiving portion which is fitted in an inner peripheral surface of the cylinder so as to slide in the axial direction, and a pressing portion which is fitted in the through hole so as to slide in the axial direction and abuts against an end surface of the outer ring disposed at the one side in the axial direction;
- a pressure supply unit that supplies a hydraulic pressure into the cylinder, through a fluid supply passage, so that the hydraulic pressure can act on the pressure receiving portion;
- a first seal member provided between the inner peripheral surface of the cylinder and an outer peripheral surface of the pressure receiving member;
- a second seal member provided between an inner peripheral surface of the through hole and an outer peripheral surface of the pressing portion;
- a check valve provided at the fluid supply passage between the cylinder and the pressure supply unit, and allows a fluid to flow into the cylinder if the hydraulic pressure is greater than a first set pressure;
- a relief valve provided at a discharge passage connected to the cylinder so as to discharge the fluid from the cylinder if the hydraulic pressure in the cylinder becomes greater than a second set pressure which is greater than the first set pressure and to close the discharge passage if the hydraulic pressure in the cylinder is less than or equal to the second set pressure; and
- a fluid supply control portion which supplies the fluid to the cylinder from the pressure supply unit via the check valve if the hydraulic pressure in the cylinder becomes less than the first set pressure, and stops the supply of the fluid from the pressure supply unit when the hydraulic pressure within the cylinder becomes greater than a third set pressure which is greater than the first set pressure but is less than the second set pressure.

7. The rolling bearing apparatus according to claim 6, wherein a plurality of the cylinders are arranged at equal intervals around an axis of a rolling bearing comprising the rolling elements, the inner ring and the outer ring, and the number of the cylinders is three or more.

8. The rolling bearing apparatus according to claim 6, wherein an air chamber is formed inside the cylinder between the pressure receiving portion and the partition wall, and a vent hole for communicating the air chamber to the exterior of the cylinder is formed in the cylinder.

* * * * *